June 5, 1934.  S. O. EDMONDS  1,961,873
VEHICLE JACK
Filed Aug. 18, 1932  2 Sheets-Sheet 1
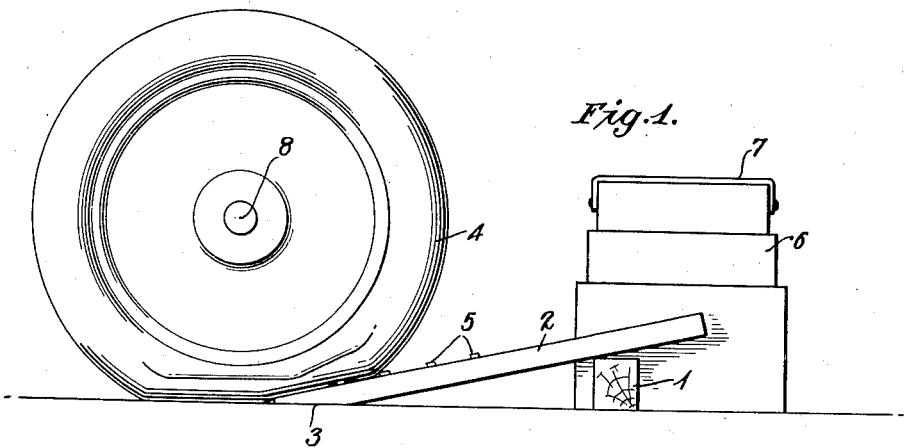
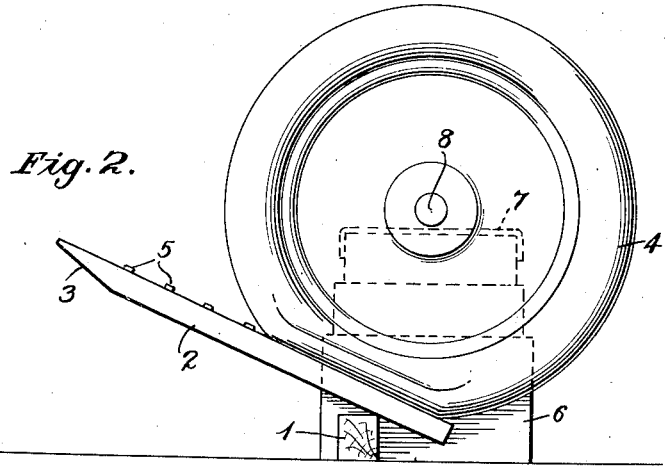
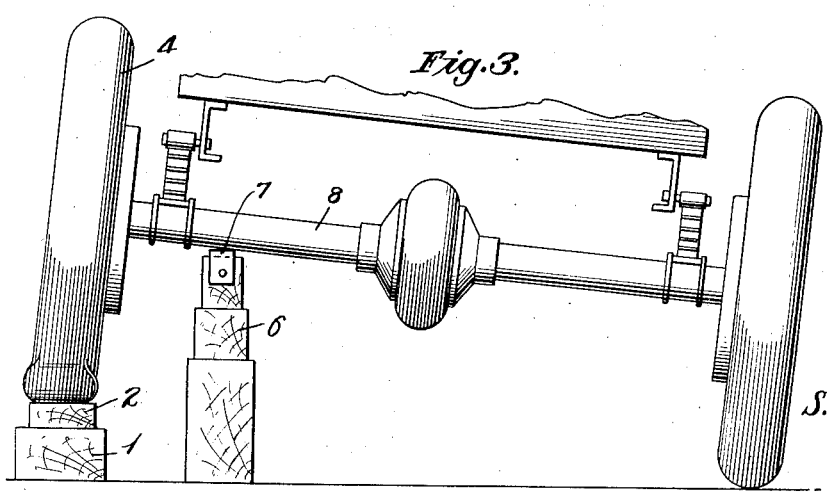
Inventor
S. O. Edmonds June 5, 1934.  S. O. EDMONDS  1,961,873
VEHICLE JACK
Filed Aug. 18, 1932  2 Sheets-Sheet 2
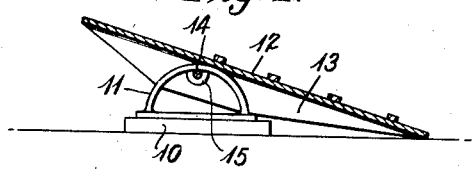
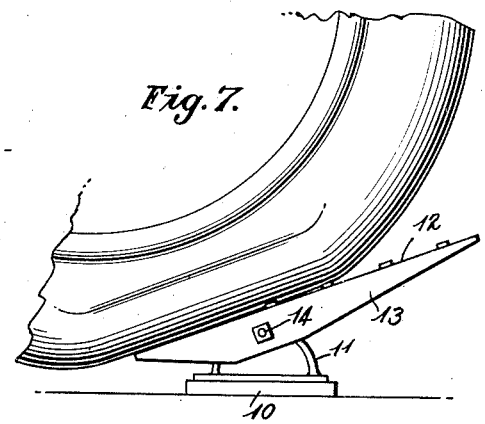
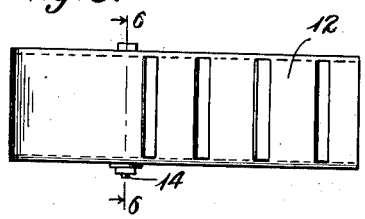
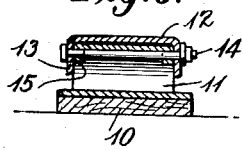
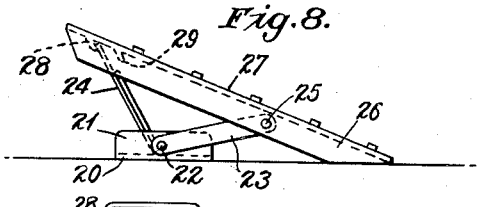
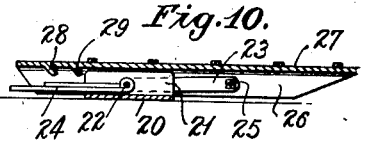
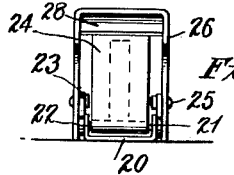
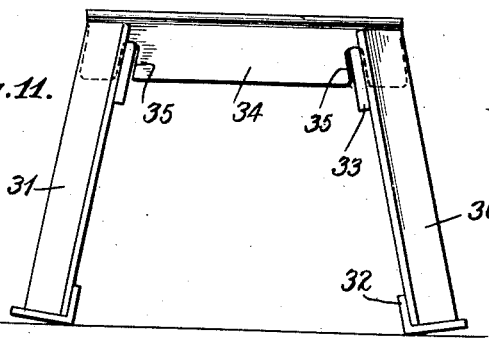
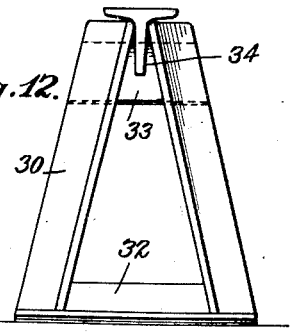
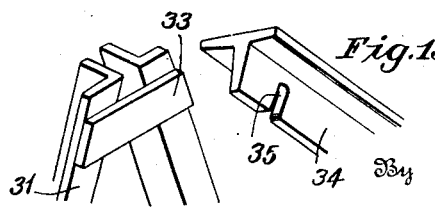
Inventor
S. O. Edmonds
Attorneys Patented June 5, 1934

1,961,873

UNITED STATES PATENT OFFICE 1,961,873

VEHICLE JACK

Sterling Owen Edmonds, Eagleville, Tenn.

Application August 18, 1932, Serial No. 629,385

7 Claims. (Cl. 254—88)

This invention relates to jacks for vehicles, particularly automobiles and trucks. The principal object of the invention is to provide a jack which can be set in position for a vehicle to be run upon it under its own motive power and which requires no further operations to clear the wheel when the vehicle has been run up into position, the wheel being suspended clear of the ground and of the jack.

Another object is to provide a jack employing a rest to support the axle and a runway for the wheel to run upon to raise the axle above the rest and then lower it upon the rest, the runway being designed to present a substantially flat surface to the wheel in all positions, to eliminate the possibility of pinching the tube or casing.

Another object is to provide a jack which can be set in position upon the ground without attachment to the wheel, and which will elevate and support the wheel free above the ground by the simple operation of driving the vehicle onto the jack under its own motive power.

Another object is to provide a jack of the type described above which can be collapsed so as to occupy a small space.

Other objects will appear from the following specification and accompanying drawings in which several forms of the invention are described and illustrated. In the drawings, Fig. 1 shows a side elevation of a simple form of the jack illustrating its principle of operation, Fig. 2 is a similar view with the wheel in elevated position just as the axle settles onto the axle rest and before the runway has been kicked out, Fig. 3 is a rear elevation of the lower rear end of an automobile showing the jack in the same position as in Fig. 2, Fig. 4 is a longitudinal section of another form of the runway portion of the jack, Fig. 5 is a plan view of the runway shown in Fig. 4, Fig. 6 is a cross section on the line 6—6 of Fig. 5, Fig. 7 is a side elevation of the same runway showing its relation to the wheel just before it is kicked out as the axle comes upon the axle rest, Fig. 8 is a side elevation of another form of runway which can be adjusted for height, Fig. 9 is a front elevation of the runway shown in Fig. 8.

Fig. 10 is a longitudinal section of the same runway in collapsed position,

Fig. 11 is a side elevation of a dismountable axle rest,

Fig. 12 is an end elevation of the same axle rest, and

Fig. 13 is a detailed view showing the joint between the supporting bar of the axle rest and one of the pairs of legs.

Referring first to Figs. 1 to 3, upon a base member 1, which may consist of a block of wood of suitable dimensions, a runway 2 is supported in inclined position. The lower end of the runway is beveled off at 3 to enable the wheel 4 mounted on axle 8 to run upon it easily. To prevent the wheel from slipping the runway may be provided with cleats 5.

Beside the runway is an axle rest 6, which, in the form shown in Figs. 1 to 3 consists simply of a column of blocks of wood protected at the top by an iron strip 7.

In jacking up the wheel the runway and axle rest are set upon the ground substantially in the relative position indicated and with the runway in line with the wheel to be jacked. The vehicle is then run upon the runway and as it travels up the runway, the runway first tilts to a horizontal position and then beyond to the position shown in Fig. 2. In the horizontal position of the runway, the axle is elevated slightly above the axle rest and as the motion of the vehicle continues and the runway tilts up further the axle is lowered gently onto the axle rest. If the wheel is a driving wheel of an automobile its continued rotation after the wheel has come upon the rest will kick out the runway, leaving the wheel freely suspended. If the wheel being jacked is not one of the driving wheels, the runway may either fall out from under it as the axle comes upon the rest, or it can be easily thrown out by giving the wheel a slight twirl by hand. To dismount the wheel from the axle rest it is only necessary to reverse the position of the runway with respect to the axle rest and the vehicle can be run by its own motive power upon the runway, which will raise the axle from its rest and set the wheel down on the ground on the opposite side of the block 1. In setting the runway to dismount the wheel, it should be pushed under the tire and then wedged up sufficiently by the block 1 to insure good traction.

Figs. 4 to 7 show a good commercial form of the runway according to the invention. An arched base member composed of a bottom plate 10 and arched rocking base 11 supports a tilting runway 12 made of a channel-shaped piece of iron having flanges 13 through which passes a bolt 14 to secure the runway and base together. The arched member 11 has ears 15 to hold the bolt 14 in position at the top of the arch. This runway may be used with any form of axle rest, such as the one shown in Figs. 1 to 3, and its operation is substantially the same as the first described form of the invention. Fig. 7 shows the runway after the wheel has passed over it and the axle settled upon the axle rest, the runway being about to be kicked out by continued rotation of the wheel.

Figs. 8 to 10 show another form of runway, this one being collapsible and occupying a very small space when not in use. Upon a base 20 having up turned flanges 21 are pivoted by means of a bolt 22 a pair of struts 23 and a single strut 24. The upper ends of struts 23 are pivoted at 25 to the down turned flanges 26 of a runway 27. Upon the bottom surface of runway 27 are two pockets formed by flanges 28 and 29 to receive the upper end of the strut 24. When the strut 24 is in the pocket behind flange 28 the runway is closer to the base than when the strut is behind flange 29. Consequently a wheel will be elevated higher by the runway when the strut 24 is behind flange 29 than when it is behind flange 28. The runway rocks upon the bolt 22 as a wheel travels over the rocking center of the runway. The operation of this runway is therefore the same as those previously described. When not in use the runway can be folded up into the position shown in Fig. 10.

Figures 11, 12 and 13 show an axle rest which is particularly adapted to be used in connection with the rocking runways described above. Two pairs of legs 30 and 31 are held in spread position at the bottom by angle irons 32 and are secured together at the top by plates 33. The tops of the legs are sufficiently far apart to allow the tongue 34 of a T-bar which forms the axle support to pass between them. The tongue of the T bar is slotted at 35 to pass over plates 33. The slots 35 slope outward and downward and thereby determine the positions of the pairs of legs 30 and 31. The parts of the axle rest can be easily assembled and disassembled and in the latter condition occupy little space. One pair of legs may be somewhat shorter than the other pair to make one end of the axle rest slightly lower, thus making it easier for the axle to pass over it.

Various modifications of the invention within the scope of the following claims will occur to those skilled in the art.

Having described my invention,

I claim:—

1. In a vehicle jack, an axle rest, a base member beside said rest having a broad ground engaging surface, and a runway freely rockably mounted on said base member in such a way that an intermediate portion of said runway is supported above the ground while one end thereof normally rests upon the ground, whereby a vehicle wheel may be run upon said runway, said runway being free to rock as the wheel travels over the rocking center of said runway and adapted to cause the wheel and axle to execute a rising and falling motion, the supporting surface of said axle rest being positioned to receive the axle during said falling motion.

2. In a vehicle jack, an axle rest, a base member beside said rest having a broad ground engaging surface, said base member including an elevated fulcrum, and a runway freely rockably mounted on said fulcrum so that it stands normally in an inclined position with one end resting upon the ground, whereby a vehicle wheel may be run upon said runway, said runway being free to rock as the wheel travels over said fulcrum and adapted to cause the wheel and axle to execute a rising and falling motion, the supporting surface of said axle rest being positioned to receive the axle during said falling motion.

3. In a vehicle jack, an axle rest, a base member beside said rest having a broad ground engaging surface, said base member including an arched support having a curved upper surface, and a runway rockably mounted on said support so that it stands normally in an inclined position with one end resting upon the ground, whereby a vehicle wheel may be run upon said runway, said runway being adapted to rock as the wheel travels over it and to cause the wheel and axle to execute a rising and falling motion, the supporting surface of said axle rest being positioned to receive the axle during said falling motion.

4. In a vehicle jack, an axle rest, a base member beside said rest having a broad ground engaging surface, a runway, struts rockably supporting said runway on said base so that it stands normally in an inclined position with one end resting upon the ground, whereby a vehicle wheel may be run upon said runway, said runway being free to rock as the wheel travels over the center of rocking of said runway and adapted to cause the wheel and axle to execute a rising and falling motion, the supporting surface of said axle rest being positioned to receive the axle during said falling motion.

5. In a vehicle jack, an axle rest, a base member beside said rest having a broad ground engaging surface, a plurality of struts pivoted on said base, a runway mounted on said struts and having spaced adjustable engaging means for connecting said struts therewith at different distances apart, whereby the distance between said base and said runway can be varied, said struts rockably supporting said runway on said base so that it stands normally in an inclined position with one end resting upon the ground, whereby a vehicle wheel may be run upon said runway, said runway being adapted to rock as the wheel travels over it and to cause the wheel and axle to execute a rising and falling motion, the supporting surface of said axle rest being positioned to receive the axle during said falling motion.

6. In a vehicle jack, an axle rest, a base member beside said rest having a broad ground engaging surface, a plurality of struts pivoted on said base, a runway connected to the opposite ends of said struts, one of said connections consisting of a plurality of spaced pockets to receive the opposite end of one of said struts in different positions on said runway, whereby the distance between said base and said runway can be varied, said struts rockably supporting said runway on said base so that it stands normally in an inclined position with one end resting upon the ground, whereby a vehicle wheel may be run upon said runway, said runway being adapted to rock as the wheel travels over it and to cause the wheel and axle to execute a rising and falling motion, the supporting surface of said axle rest being positioned to receive the axle during said falling motion.

7. In a vehicle jack, a channel bar forming a runway, strut means pivoted to the flanges of said channel, a base member pivoted to the opposite end of said strut means, additional strut means pivoted to said base member on the same axis as said first strut means, means on said channel bar for disengageably receiving the opposite end of said second mentioned strut means, said strut means and channel bar forming a triangle in their operative position, said strut means and base being adjusted to fold into the channel of said channel bar in their inoperative position.

STERLING OWEN EDMONDS.